United States Patent Office

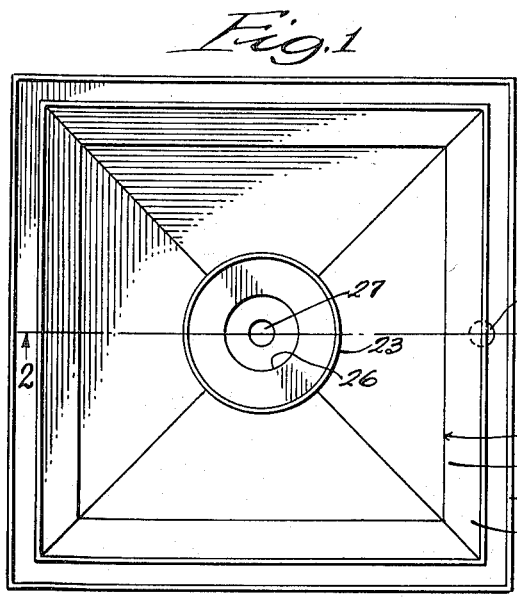
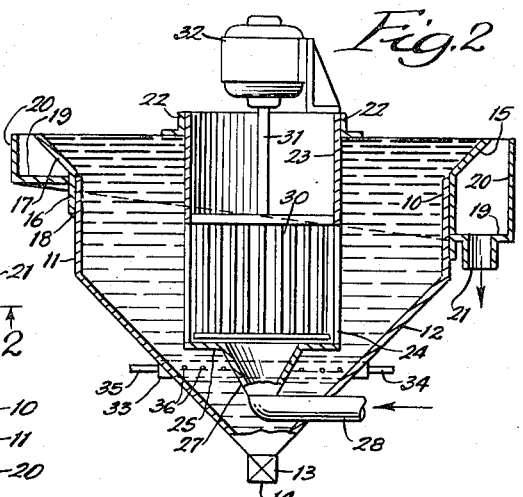
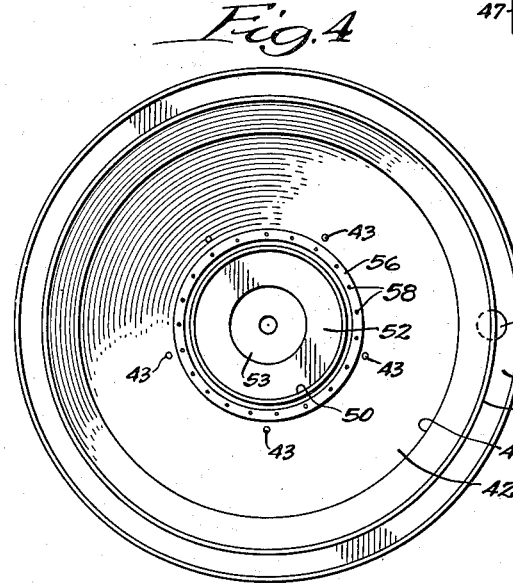
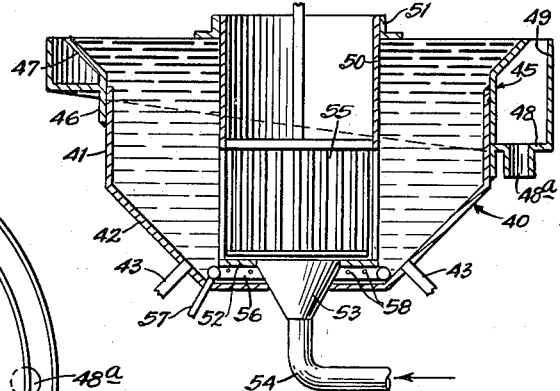

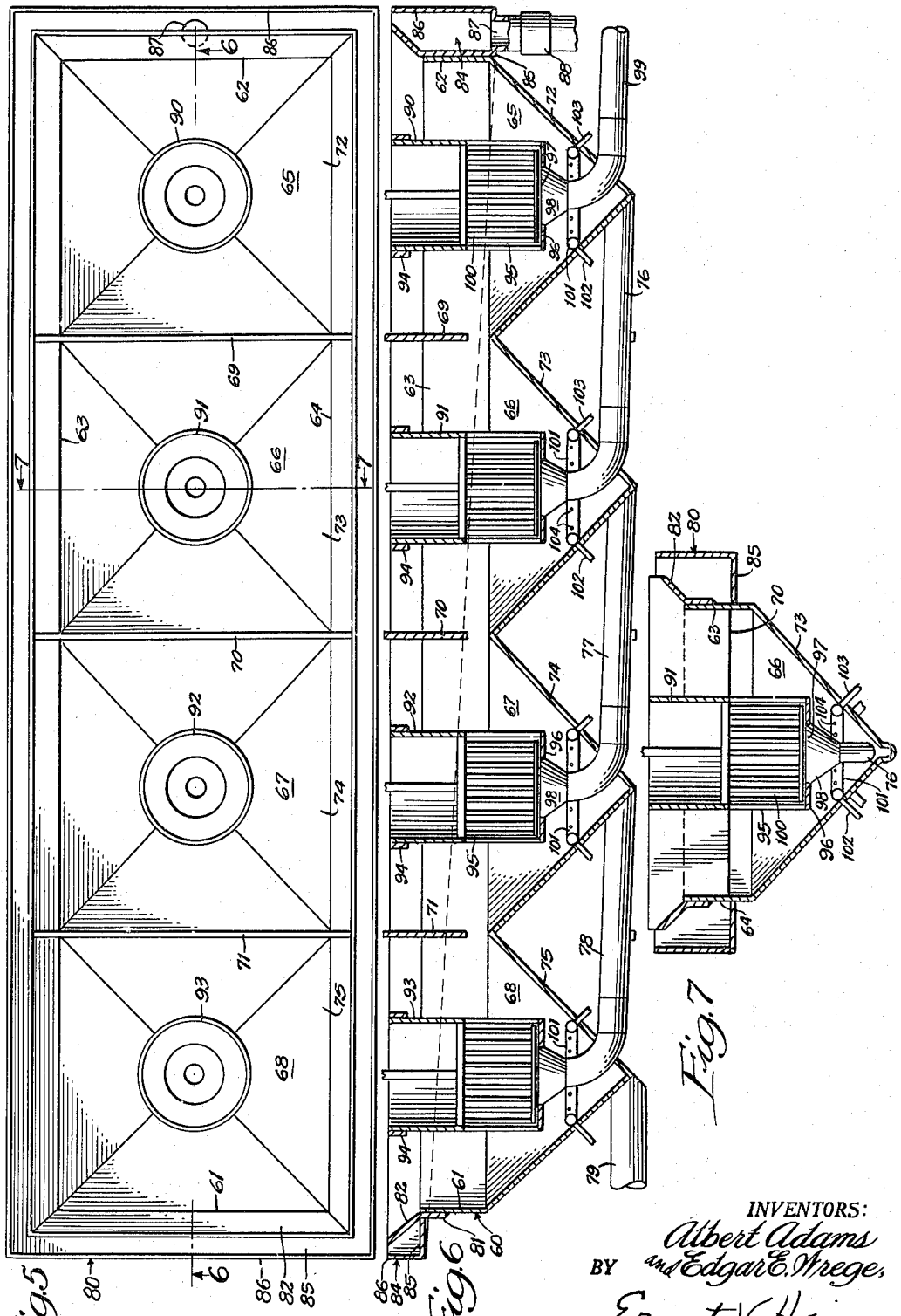

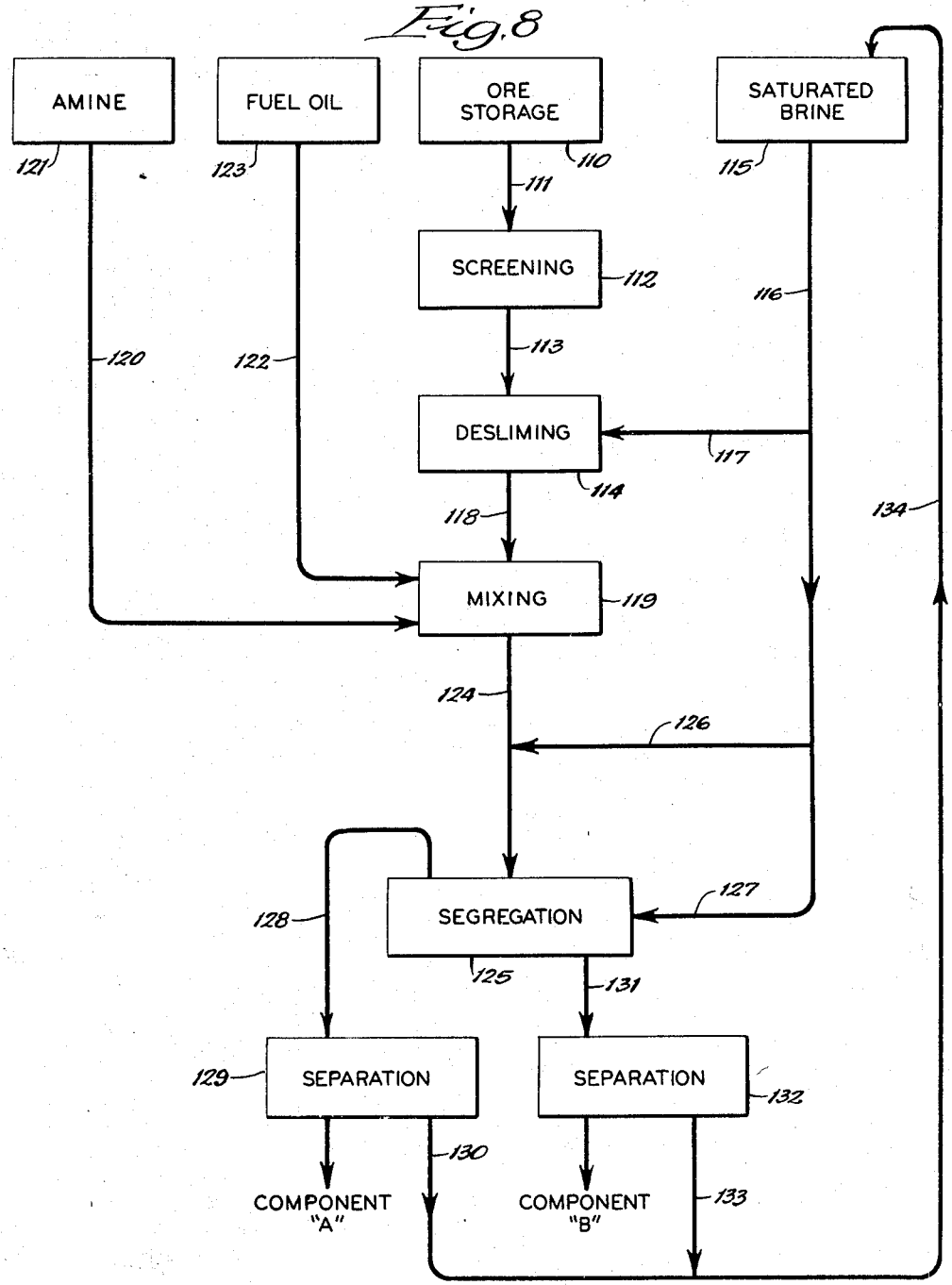

2,733,809
Patented Feb. 7, 1956

2,733,809

PROCESS FOR THE CONCENTRATION OF POTASH ORE

Edgar E. Wrege, Lakeland, Fla., and Albert Adams, Carlsbad, N. Mex., assignors to International Minerals & Chemical Corporation, a corporation of New York Application November 19, 1953, Serial No. 393,118

14 Claims. (Cl. 209—166)

This invention relates to the concentration of granular particled minerals directly from their ores. More particularly, it has reference to the entrainment of coarse granular products which have been conditioned to afford buoyancy in a flowing stream whereby the preferentially wetted particles are separated from the non-wetted particles of substantially the same average particle size. Still more particularly it relates to concentration of granular sylvite obtained from potash ores located in the Carlsbad, New Mexico, district.

Most of the potash consumed in the United States is for agricultural activities. A minor part of that produced finds use in the manufacture of other potassium compounds. While there are some uses for low-grade potash, that is, having a muriate of potash equivalent of less than 60%, most of the potash consumed by agriculture and industry is of high grade and has a muriate of potash equivalent of at least 60%.

It has long been known that the coarse granular form of potash, having a mesh size between 3 and 20, is desirable for agricultural use. Potash in this form does not cake so readily as the finer form. It flows more freely and is more quickly and efficiently applied to the soil than is the finer mesh material.

For the aforementioned reasons, considerable effort has been expended in attempting economical production of coarse granular 60% $K_2O$ muriate of potash. Since sylvinite is the most plentiful of potash ore deposits, much effort has been expended in attempting to produce the granular 60% $K_2O$ equivalent muriate of potash from sylvinite ore. This ore is a mechanical mixture of halite (NaCl) and sylvite (KCl), with the principal deposits being located in Texas and New Mexico. Langbeinite-sylvinite mixed ores, which are mechanical mixtures of halite, sylvite, and langbeinite ($K_2SO_4 \cdot 2MgSO_4$), are also a plentiful source of muriate of potash.

One of the earlier methods for producing coarse granular sylvite, or muriate of potash as it is known in the trade, was to briquette fine, high-grade sylvite and then grind the briquettes to the desired mesh size. This method has largely been replaced by the so-called tabling process. In this process sylvinite ore is ground to a coarse granular form and deslimed. The deslimed ore is then made into a pulp consisting of about 30% saturated aqueous solution of said ore and about 70% solid ore. This pulp is conditioned with fuel oil, kerosene, or some other water-immiscible, unsaponified petroleum product, and a selective agent of the class of surface active agents consisting of certain aliphatic amines. The pulp thus conditioned is subjected to a shaking table of the Wilfley type. By this process, a 50% $K_2O$ equivalent granular muriate may be produced in a single operation. However, it has been found that to produce 60% $K_2O$ muriate by this process an impractical number of tables are required where commercial amounts of ore are to be processed, or it necessary to grind to finer sized particles and to reprocess the halite-sylvinite mixtures retained by the lower riffles of the tables and collected by froth flotation to obtain a 60% $K_2O$ equivalent muriate.

Another process of concentrating sylvinite, revealed in U. S. Patent No. 2,420,476, issued to Greene et al., is the froth flotation of 10 to 20 mesh feed material. In this process a pulp is conditioned first with a petroleum oil, followed by treatment with an aliphatic amine and a frothing agent such as pine oil. It is stated therein that the use of a frothing agent is not essential to the process. Such a process produces a concentrate of 60% grade without difficulty. However, it will be observed from the foregoing processes that it has not hitherto been thought feasible to produce a coarse granular product larger than 10 mesh by employing flotation processes.

Heretofore, flotation of material coarser than 10 mesh has not been feasible in that conventional flotation cells could not handle such coarse material. Practically all flotation cells designed in the past have been limited to the handling of ores which have been crushed to a size range finer than 10 mesh. When the ore has been ground to a fine mesh size the particles can be readily kept in suspension in the cell, and solids do not unduly accumulate at the bottom of the cell. Thus, the finer ground reagentized feed could be introduced at any point and contacted with air bubbles. Each bubble, starting at the bottom of the cell and progressing upward, picked up reagentized particles on its way, and by the time it reached the surface had several reagentized particles coating it. Tails in this type of operation remained in suspension in the cell, and the brine or liquid medium was removed from any point in the cell and carried tails with it. In practice, tails were usually removed at a point in the side of the cell.

In coarse granular flotation, different conditions obtain due to the size and weight of the particles. It would be impractical to try to keep the coarse granular particles in suspension. The tails drop rapidly to the bottom of the cell where they must be removed immediately to prevent accumulation. Also, instead of one air bubble floating several particles, a number of bubbles are required to float each granular particle, thus necessitating much more efficient aeration than realized in cells presently used.

It is the principal object of this invention to concentrate material in coarse granular form.

Another object of this invention is to produce directly from potash ores a coarse granular sylvite of 60% or more $K_2O$ equivalent.

It is a further object of the invention to produce directly from potash ores coarse granular concentrates of particles of −3 to +20 mesh size.

Another object of this invention is the economical production of granular sylvite from coarsely ground sylvinite ore without the production of an intermediate product.

Another object of this invention is the economical production of granular sylvite from coarsely ground sylvinite-langbeinite mixed ores.

Another object of this invention is the recovery of sylvite and langbeinite, each in coarse granular form, from coarsely ground sylvinite-langbeinite mixed ores.

It is another object of this invention to provide a process wherein ore particles of relatively uniform size can be subjected to treatment, whereby particles of one constituent of the ore are selectively conditioned in order to cause the particles to act in a flowing stream as though there were a wide specific gravity differential, and the apparently lower specific gravity particles are floated away from the other component thereby effecting separation.

It is still another object of this invention to provide a process for removal of coarse granular halite as the apparently lower specific gravity constituent from sylvite of substantially the same average particle size.

It is a further object of this invention to provide a process for removal of coarse, granular sylvite from sylvinite ore containing halite particles of the same average particle size as the sylvite by entrainment in a flow stream of solids-free sylvinite brine.

It is the further object of this invention to provide a process for the removal of coarse granular sylvite from sylvinite-langbeinite mixed ores containing halite and langbeinite particles of the same average particle size by entrainment in a flow stream of mixed ore brine, saturated at least with respect to sylvinite.

The instant novel process is applicable to the recovery of coarse granular products from potash ores such as sylvinite, langbeinite, carnallite, polyhalite, mixed ores such as sylvinite-langbeinite ore and the like, phosphate pebble ore, and in general to ores whose components can be liberated at particle sizes coarser than those normally used for froth flotation.

While the instant novel process as hereinafter described refers to ores containing sylvinite, the principles thereof will have application, with modifications which will occur to those famliar with the art of ore separation, wherever it is desired to obtain a coarse particled product, for example, Florida phosphate ore of −1 millimeter +35 mesh size. Besides employing a feed material of at least −3 mesh, the only other limitation in the employment of the principles of the instant novel process is the grinding of the feed material to a size whereby economical liberation of the product from impurities is obtained.

The term "brine," as used in the description and claims, refers to a saturated aqueous solution of sylvinite ore, and the term "mixed ore brine" refers to an aqueous solution prepared from a mixture of langbeinite and sylvinite ores, which is at least saturated with respect to sylvite and halite.

Where the components of an ore which are to be separated in addition to being coarse and granular, have specific gravities which are of relatively the same magnitude or sufficiently close to make separation by known methods such as froth flotation difficult, the coarse particles may be selectively conditioned with surface coating reagents and aerated sufficiently to make one component apparently appreciably lower in specific gravity and thereby have a buoyancy permitting separation in a flowing liquid stream. These surface coating reagents will vary with the type of ore and the component of the ore which it is desired to recover as a tail. For example, if halite is to be floated from sylvinite ore or from sylvinite-langbeinite mixed ores, the ore may be treated with reagents which upon aeration will impart buoyancy to the granular halite component. Reagents useful for this purpose are, for example, fatty acids such as oleic, palmitic and the like, petroleum acids such as cresylic acid and phenolic acids, also soaps such as coconut oil soap, palm kernel soap, resin soaps, sodium naphthenate, and the like, or combinations of the above.

If, on the other hand, potassium chloride or sylvite is to be floated from sylvinite ore or from sylvinite-langbeinite mixed ores, the ore may be treated with reagents which upon aeration will impart buoyancy to the granular sylvite component. Reagents useful for this purpose are, for example, aliphatic amines such as n-lauryl amine, n-dodecylamine, and the like, preferably in the form of their water-soluble mineral acid addition salts, alkali salts of sulfated alcohols, such as sodium lauryl sulfate, potassium octyl sulfate, and the like. These reagents may be utilized alone or in combination with one another and/or in combination with auxiliary combinations of reagents such as fuel oil, kerosene, and the like.

If langbeinite is to be floated from ores containing langbeinite, such as the sylvinite-langbeinite mixed ores, the ore may be treated with reagents which upon aeration will impart buoyancy to the granular langbeinite component. Reagents useful for this purpose are, for example, alkali sulfonates and ester sulfonates of derivatives of fatty acids of high molecular weight such as oleic or other saturated or unsaturated acids having eleven or more carbon atoms. These reagents may be employed alone or with other auxiliary reagents, known to the art, such as pine oil, fatty acids, and the like.

In practicing the instant novel process, amines may be used in conjunction with sulfonates to effect the separation of coarse granular langbeinite and coarse granular sylvite from the other constituents of the ore in the form of a mixed concentrate. In another embodiment of the instant novel process, sulfonates and amines may be used successively and separately to produce separate and successive concentrates of coarse granular langbeinite and coarse granular sylvite from potash ores containing them.

The quantities of reagents required will vary for each ore and will be further dependent upon the specific gravity of the floated component as well as the density of the moving liquid stream, among other things. Under such conditions a statement of quantity can only be made with reference to a specific separation of components of a specific ore as will be set forth hereinafter.

In order to carry out clean separations, it is necessary to utilize a moving liquid which is substantially stable. By stable is meant a solution which will not appreciably alter its composition as by dissolving one or more of the components of the ore being separated, crystallize out a component, or dissolving a component from the ore while crystallizing out a solid foreign to the separation, or the like.

Stable concentrations of substances dissolved in water, as used in the instant process, are principally controlled by temperature. The separation by this process of the ore components may be accomplished throughout the range of temperatures encountered in the art of flotation, providing that the composition of the brine is stable at the temperature of operation.

The accompanying drawings show apparatus specifically embodying the instant invention.

Figure 1 is a plan view of a square flotation cell.

Figure 2 is a vertical sectional view along the line 2—2 of Figure 1.

Figure 3 is a diagrammatic section through the center of the truncated circular apparatus.

Figure 4 is a top plan view of Figure 3.

Figure 5 is a plan view of a multiple segment cell.

Figure 6 is a vertical sectional view along the line 6—6 of Figure 5.

Figure 7 is a vertical sectional view along the line 7—7 of Figure 5.

Figure 8 is a flow sheet of the process of the invention.

Referring to the drawings, Figures 1 and 2 illustrate a preferred embodiment of the invention in which the flotation cell consists of an outer shell 10 of square configuration, having an upper wall portion 11 and a pyramidal bottom 12. Pyramidal bottom 12 terminates in a suitable discharge outlet 13 provided with fluid flow control means 14, such as a gate valve. Mounted atop the upper wall 11 is an adjustable overflow weir 15. Weir 15 consists of a square tubular wall portion 16 joined at the top to an outwardly angled wall 17. The angle of the outwardly angled wall being preferably approximately 45 degrees. As illustrated, liquid leakage is prevented by suitable sealing means 18, such as caulking. Extending laterally from all sides of wall 6, and then vertically, are the walls 19 and 20 which form a trough or launder. The trough extends along all four sides of the shell and is adapted to progressively deepen toward one end. At the deep end the trough is provided with suitable outlet means 21. Within outer shell 10 is suspended, by suitable means 22, an inner tubular member 23. The lower portion of member 23 is slotted as at 24. The bottom of member 23 is closed by a wall or plate 25. Wall 25 is axially apertured as at 26. Secured to the wall 25, and surrounding aperture 26 is a truncated cone-shaped intermediate conduit section 27 which is joined at the small end to piping 28, which delivers feed material from a source not shown.

Mounted within member 23 for support, is a suitable agitator unit 30 of the squirrel cage-type fashion in Fagergren level-type machines, the end plates of which are cut-out propellers. The agitator unit 30 is connected through a shaft 31 to an electric motor 32. Below inner tubular member 23 is a brine ring 33 adapted with inlet means 34 and 35. Ring 33 is provided with a multiplicity of ports 36.

In operation of the floation cell, the conditioned slurry with coarse granular particles, enters the inner portion of member 23 through piping 28 and conduit section 27. Within tubular member 23 the material is agitated and aerated. Following thorough aeration, the treated material is discharged through slots 24 into the space between inner member 23 and outer shell 10. During this operation a brine solution is pumped through ring 33 and ports 36 into this space between inner member 23 and outer shell 10. The brine flowing upwardly entrains the materials issuing through slots 24. The aerated coarse particles caught in the upward stream are carried over the weir wall 17 into the trough from whence coarse solids are withdrawn through outlet means 21. Unaerated particles generally travel in the upwardly sweeping brine stream for an appreciable distance, and then move to a more quiescent zone and settle downwardly into the bottom 12 of outer shell 10, and are withdrawn as tailings through discharge outlet 13.

Referring to Figures 3 and 4, in which is illustrated a second embodiment of the invention in the form of a single unit of configuration different from that of the basic unit of Figures 1 and 2, the flotation cell consists of an outer shell 40 having an upper cylindrical side wall 41 and a truncated conical bottom wall 42. Conical bottom wall 42 is provided with circumferentially-spaced discharge outlets 43 for tailings, adjacent the small end of the truncated cone. Mounted atop cylindrical side wall 41 is adjustable overflow weir unit 45. Weir 45 consists of a cylindrical wall portion 41 and an outwardly angled wall 47. The weir 45 is illustrated as having an internal diameter approximately equal to the external diameter of the cylindrical side wall 41 of the outer shell 40.

If desired, the weir may be adapted to fit inside cylindrical wall 41. Extending laterally from the cylindrical wall 46 and then vertically, are the walls 48 and 49 which form a trough or launder. Wall 48 extends in cylindrical fashion around the circumference of the cylindrical side wall 41. Wall 49 is progressively wider as it extends parallel to the circumference of the cylindrical wall 41, in order to maintain a leak-proof fluid trough. At the lower point in its helical path, wall 48 is provided with suitable outlet means 48a adapted with coupling means for attachment of flow conduit. An inner tubular member 50 of identical construction with inner tubular member 23, is suspended by suitable means 51 within outer shell 40. This inner tubular member extends to a point adjacent the small end of the truncated bottom wall 42. The bottom of member 50 is closed by a wall or plate 52. Wall 52 is axially apertured as at 53. Secured to wall 52 and surrounding the aperture point 53 is a suitable conduit 54 which delivers feed material from a source not shown. Mounted within member 50 is an agitator unit 55 identical with that described in conjunction with the apparatus of Figures 1 and 2. Resting on the small end of truncated cone bottom 42 is a liquid distributing ring 56 adapted with inlet means 57 and provided with outlet ports 58.

Referring to Figures 5, 6 and 7, therein is illustrated an embodiment of the invention in which the flotation cell consists of an outer shell 60, of rectangular shape, having end walls 61 and 62 and side walls 63 and 64. Shell 60 is divided into four square segments 65, 66, 67, and 68 by partitions 69, 70, and 71, each partition apertured to permit maintenance of common liquid level in each of the cell segments. Segments 65, 66, 67, and 68 are each closed at the bottom by pyramidal units 72, 73, 74, and 75, respectively. Pyramidal units 72, 73, 74, and 75 are connected with conduits 76, 77, 78, and 79, respectively. Conduits 76, 77, and 78 being the feed inlet conduits for segments 66, 67, and 68, respectively, and conduit 79 being the tails discharge conduit.

Mounted atop the vertical walls of shell 60 is an adjustable weir unit 80. Weir 80 consists of rectangular wall member 81 which has an upper portion thereof outwardly angled to form a continuous lip 82. The member 81 is illustrated as fitting the outside of outer shell 60. As illustrated, liquid leakage is prevented by suitable sealing means, such as caulking. If desired, however, the weir may be adapted to fit inside the outer shell 60. Segments 65 and 68 discharge material over the weir wall on three sides of each segment, whereas segments 66 and 67 discharge overflow over only two side walls, the partitions 69, 70, and 71 being sufficiently high to prevent movement of floated material longitudinally of the cell. Extending from the side walls 61, 62, 63, and 64 of shell 60 is the L-shaped member 84 which consists of laterally extending wall 85 and the vertically extending wall 86. L-shaped member 84 forms a trough or launder. Wall 85 extends along sides 63 and 64 at an angle transverse to the vertical so that the trough becomes progressively deeper from one end to the other of the shell 10. Wall 86 is progressively wider in order to maintain increasing capacity as the trough approaches the outlet. At the deep end the trough wall 85 is provided with suitable outlet means 87 adapted with suitable coupling means 88 for attachment of flow conduit. Within each segment 65, 66, 67, and 68 of outer shell 60, there are inner tubular members 90, 91, 92, and 93, identical in construction and also identical with the inner members described in conjunction with Figures 1 and 2. These tubular members are suspended by conventional means 94, such as channel irons on the supporting frame. The lower portion of member 90 is slotted as at 95. The bottom of member 90 is closed by a wall or plate 96 which is axially apertured as at 97. Secured to the wall 96 and surrounding the aperture 97 is a truncated cone-shaped intermediate conduit section 98 which is joined at the small end to feed inlet conduit 99. Members 91, 92, and 93 of identical construction to member 90 are connected by intercellular conduits 76, 77, and 78, respectively. Mounted within each tubular member and resting on the bottom plate is a suitable agitator 100 which is identical with the agitator units hereinbefore described. Adjacent the bottom of each cell member is a tubular liquid distributing member 101, such as a ring adapted with multiple inlet means 102 and 103. Member 101 is apertured with a multiplicity of outlet ports 104.

In the operation of this flotation cell a conditioned slurry of coarse granular particles enters the inner portion of member 90 set in shell segment 65 through piping 98 and 99. Within tubular member 90 the slurry is agitated and aerated. After aeration the material is discharged through slots 95. During this operation a brine solution is pumped through ring member 101 and ports 104 into the space between inner member 90 and the walls of segments 65 of shell 60. The brine floating upwardly entrains the particles issuing through slots 95. At least a portion of the aerated coarse particles are caught in the upward stream and are carried over the lip 82 of the weir 80 into the launder. Material not floated over the weir, which includes insufficiently aerated floatable material and tailings, accumulates in the sump formed by the inverted pyramidal bottom 72 and passes, by means of conduit 76, with the underflow to the interior of tubular member 91 in segment 66. In segments 66, 67, and 68 of shell 60, the underflow from the previous segment becomes the feed to the successive segment. In turn, the underflow from segment 65 enters segment 66, is aerated and entrained in brine solution for flotation of aerated coarse particles. The underflow from segment 66 is delivered to the inner member 92 positioned in segment 67 where the treatment is repeated. The underflow from segment 67 is subsequently treated in segment 68 from which segment the bottom discharge is through conduit 79. All the overflow from segments 65, 66, 67, and 68 are delivered to the common launder and thereafter delivered by suitable conduit to stations designed for further processing of the coarse segregated particles.

Figure 1 can be used to illustrate the operation of the instant novel apparatus when coarsely ground sylvinite ore in a pulp is subjected to flotation. The reagentized feed, of coarsely ground reagentized sylvinite ore, is allowed to directly enter the agitating and aerating element 30 by means of pipe 28. Sufficient air enters said element through the air inlet in order to insure complete aeration and intimate contact of air with reagentized particles as the latter pass through it. The total feed is brought directly into the agitating element 30, which is sealed off from the cell proper to prevent recirculation of particles or of the liquid from the cell outside of the inner member 29. The brine enters the cell through brine ring 33. The flow of the brine is regulated to maintain the desired solids density in the cell medium. The feed slurry has a higher slurry density than the slurry in the cell proper, which makes it possible to incorporate the maximum quantity of air. Control of the air supply by means of control of the slurry density of feed is responsible for increased recovery and the huge capacity of this type of cell. As the feed passes from the inner element 29 into the cell proper, the major portion of the halite tails immediately settles out towards the bottom of the cell. The conical bottom of the cell provides for efficient accumulation of the tails, and the tails are withdrawn at a sufficiently rapid rate to prevent thickening to the point where they will not flow readily. The upward current of the brine aids both in lifting the sylvite concentrate to the surface and in removing the concentrate from the cell by overflowing the weir 13 into the launder.

In the design of the cell, no attempt was made to maintain the particles of the mineral in uniform suspension in the cell. However, sufficient agitation is used to insure complete aeration and intimate contact of air with reagentized particles as the feed passes through the agitating element 30. This is accomplished by bringing the total feed directly into the agitating element 30 which is enclosed so as to prevent recirculation of the particles or of the brine. Only the incoming feed passes through the agitator in addition to the air which is brought into contact with the feed. By eliminating the recirculation through the agitating element of the contents of the cell outside of the agitating element, maximum dispersion of air in the feed slurry for any given feed rate and thus maximum aeration of the particles is realized.

The pyramidal or conical bottom of the cell provides efficient means for accumulation of the trails which settle out toward the bottom immediately after passing through the agitating unit. These tails are thickened and withdrawn at a sufficiently rapid rate so that the solids do not build up and destroy the efficiency of the cell.

The brine introduced through the brine ring 33 provides a directional upward current of brine in the cell in the region outside of the agitating unit. This upward current aids in forcing the desired mineral to the surface and its removal as soon as it reaches the surface. It also provides for the removal of tails from the bottom of the cone in a sufficiently thin slurry without removing necessary fluid from the cell. By means of the brine so introduced, the density within the cell is controlled by adjusting the flow of brine entering the cell relative to the feed slurry introduced. This permits use of a high density feed slurry which in turn provides for maximum introduction of air by means of the agitating element 30. The air supply is thus controlled through control of the slurry density of the feed.

The brine made from the ore, or a liquid in which the desired product is substantially insoluble, is added in fairly large volume to the cell in amounts sufficient to cause the contents of the upper strata of the cell, containing floated or semifloated particles of the coarse granular product, to overflow the floation cell in a sizeable stream or volume of liquid medium. The mixture containing the product is collected and the coarse granular product separated therefrom.

In the preferred embodiment of the instant invention, a pulp is prepared comprising essentially coarsely ground, conventionally reagentized sylvinite ore, for example, as described in U. S. Patent No. 2,420,476, in an aqueous solution saturated with respect to said ore. The pulp is conducted to the aerating agitating element 30 of the cell as above described. After passing through the aerating element 30, the solids, due to their coarseness, have a tendency to quickly settle. Therefore, relatively vigorous agitation in the lower strata of the cell is necessary to keep the particles in an unsettled condition, thus insuring that the sylvite may be moved upward. Uncontrolled vigorous agitation alone, however, tends to resubmerge the floated sylvite particles. It has been found that to successfully float coarse granular particles of sylvite with economic recovery, it is necessary to maintain a controlled balance of agitation and surface conditions so that the solids remain agitated in the lower strata and quiescent in the upper strata. This is accomplished by adding a sufficient quantity of aqueous solution saturated with respect to sylvinite ore to the agitated pulp at a point below the liquid level in the flotation cell, i. e., through the brine ring 33 or 56 so as to cause a mixture of floated or semifloated particles of coarse granular sylvite and brine to overflow the flotation cell while employing the aforesaid condition of controlled agitation. Under these conditions, the pulp density of the concentrate is less than that ordinarily obtained in the flotation of sylvinite ore as now practiced. This mixture is collected, and coarse granular sylvite is separated therefrom.

The process of the instant invention will be understood from the attached flow sheet, Figure 8 of the drawings, taken in conjunction with the above description of apparatus.

In the flow sheet, the numeral 110 indicates ore storage. Ore is delivered by suitable conveying means 111 to the screening mechanism 112. From screening 112 the ore is moved by suitable conveyor 113 to a desliming station 114 where the screened ore is washed with brine delivered from the saturated brine storage tank 115 through conduit 116 and branch pipe 117.

Deslimed ore is delivered by conveying means 118 to a mixing chamber 119. In chamber 119, the ore is selectively coated with a surface coating reagent such as an amine delivered through pipe 120 from storage tank 121 and with an auxiliary reagent, for example, a suitable petroleum hydrocarbon oil such as fuel oil delivered through conduit 122 from a storage tank 123.

The conditioned pulp is delivered through conveyor means 124 to the segregation station 125. The conditioned pulp, if of too high a rock concentration, may be diluted with saturated brine delivered through branch pipe 126 from conduit pipe 127.

The brine and ore component A overflowing the top of segregation station 125 is conducted through pipe 128 to separation or dewatering station 129. The station 129 which may be any suitable apparatus such as a centrifuge, classifier, or the like, recovers the saturated brine which is delivered through conduit 130 to common return pipe 134.

Bottoms or tails from segregation station 125 is a mixture of solids and generally a lesser amount of brine than is delivered through pipe 128. The mixture is delivered through conduit 131 to a separation station 132 which may or may not be apparatus identical with that used at separation station 129. From separation station 132 are recovered two materials, component B of the feed and brine which is delivered through pipe 133 to return pipe 134 for delivery to the brine storage tank 115 for recirculation in the system.

While there is no intention to limit the invention thereto, since any liquid in which the sylvinite is substantially insoluble may be employed, in the preferred embodiment of this invention as hereinafter described in detail the high density brine is employed.

Sylvinite ore is ground to between about 4 and about 20 mesh size. The ore, after having been pulped with high density brine which was saturated with respect to sylvinite at a solids density of 65% or more, is then treated with a selective agent of the class of commonly used surface active agents, for example, aliphatic amines such as octadecylamine acetate, followed by treatment with fuel oil, kerosene, or some other water-immiscible, unsaponified petroleum product. It is not intended to limit the instant novel process to this specific flotation reagent; rather, it is to be noted that any reagents commonly used in the flotation or tabling of sylvite from sylvinite ore may be employed.

While the recovery of a granular sylvite of 60% $K_2O$ equivalent is substantially the same whether high density brine or saturated aqueous solution of sylvinite is used, the sylvite particles have greater buoyancy if the pulp is prepared with high density brine. As previously stated, the latter is prepared by saturating the reject liquor from a sylvinite-langbeinite base exchange process with sylvinite. The reject liquor, before saturation with sylvinite, has substantially the following composition: 2.99% K, 5.67% Mg, 1.21% Na, 16.53% Cl, 6.15% $SO_4$, and after saturation is in equilibrium with sylvite, halite, leonite, and/or kainite. It is not intended to limit this invention to a coarse granular sylvinite ore of −4 and +20 mesh since the mesh size commonly employed in conventional potash flotation processes may be employed. In the preferred embodiment of this invention, however, the ore is coarsely ground to the aforementioned size, mixed with the aforesaid saturated aqueous solution of mixed salts of high density (high density brine) in the ratio of approximately two parts of sylvinite ore to one part of saturated solution, and conditioned with appropriate reagents. The conditioned pulp is then diluted to approximately one part of sylvinite ore to three parts of brine, placed in a segregation cell, and agitated vigorously so that the solids are maintained in an unsettled condition. The agitation is confined substantially to the lower strata of the contents of said cell by careful control of the rate and manner of agitation. As used hereinafter in the description and claims, the term "lower strata" refers to that portion of the contents of the cells which at the beginning of agitation contains a substantial majority of the solids, said solids comprising essentially halite and unfloated particles of sylvite. Depending upon the ratio of solids to saturated aqueous solution used in preparing said pulp and the size of the solid particles of ore, the volume of the cell included by the term "lower strata" is between about the lower 2/3 and about the lower 1/2 of said flotation cell.

The term "upper strata," as hereinafter used in the description and claims, refers to the contents of between about 1/2 and about 1/3 of the upper portion of said cell. At the commencement of agitation, the upper strata contains essentially the high density brine and only small amounts of sylvite particles. As the agitation and aeration is continued, additional coarse granular sylvite rises into the upper strata. Since too vigorous an agitation tends to submerge the floated particles of sylvite, a controlled balance between agitation and surface conditions is required. These conditions are obtained by controlling agitation and the resultant currents in the cell so that the reagentized sylvite is carried into the upper strata of said cell. Mere controlled agitation was found not to be suitable for flotation of coarse granular sylvite. Increasing the rate of agitation merely causes the impurities to become mixed with the sylvite and the particles of sylvite to resubmerge. Therefore, the agitation must be controlled so that the pulp is merely maintained in an unsettled condition. This allows the coarse, reagentized sylvite to rise into the upper quiescent strata of the cell. When these conditions have been obtained, the aforesaid high density brine is added preferably at, or near, the approximate upper limits of the lower strata of said cell. The aforesaid brine is added in such quantities as will cause the contents of the upper strata containing the coarse granular sylvite to overflow. The depth of the overflow as measured at the weir of the cell is preferably somewhat in excess of the average diameter of the coarse sylvite particles. If the depth of the overflow is less, the sylvite particles have a tendency to strike the weir of the cell and resubmerge. The addition of high density brine augments the upward current in the cell, thereby assisting in moving the coarse granular sylvite upward against the pull of gravitation. Also, due to the high density of the brine, the buoyancy of the sylvite particles is increased. The aforesaid mixture of coarse granular sylvite and saturated high density brine is collected after it has overflowed the flotation cell, and the solid, coarse granular sylvite is separated therefrom by commonly employed methods. Table I compares the results obtainable by using the instant novel process and the aforementioned tabling process.

TABLE I

| Average Feed Analysis | Process | Product Analysis | Percent Product Recovery | Middling Analysis | Tailings Analysis |
|---|---|---|---|---|---|
| 19.84% $K_2O$ | Tabling | 50.00% $K_2O$ | 91–92 | | 2–3% $K_2O$. |
| 19.84% $K_2O$ | do | 60.00% $K_2O$ | 30–35 | 30–40% $K_2O$. | |
| 19.84% $K_2O$ | Flotation | 60.18% $K_2O$ | 97 | | 0.88% $K_2O$. |

The results were obtained by an analysis of the material contained on various parts of a Wilfley table employed as previously described. The same feed material as used in the tabling process was then employed in the instant novel process. It will be noted from a study of Table I that a product of 60% $K_2O$ equivalent may be obtained by the tabling process previously described. However, this requires that only the contents of the upper 30% to 35% of the table be processed. An analysis of the contents of the middle 30% to 35% of the table is reported in column 5 of Table I as having a $K_2O$ equivalent of between about 30% and about 40%. This material may be further processed to give the intermediate product to which reference has previously been made, or, as previously stated, ground and cycled to a flotation circuit to obtain a 60% $K_2O$ product. It is obvious from a study of the table that the instant novel process, where the percentage recovery of 60% $K_2O$ product is approximately 97%, is to be preferred over the less efficient tabling process.

To facilitate a clearer understanding of the instant novel process but with no intention of being limited thereto, the following examples are given:

*Example I*

Feed material is prepared by grinding enough sylvinite ore to yield 200 pounds of between 5 to 20 mesh size ore. Average screen analysis of this ground ore by accumulative weight percent was: 6% +6 mesh, 40% +8 mesh, 80% +10 mesh, 95% +14 mesh, and 100% +20 mesh.

A pulp was prepared by admixing 700 grams of the aforesaid ground ore and 300 grams of saturated brine of sylvinite. The pulp thus prepared was reagentized with 0.225 gram of octadecylamine acetate, and 1.375 grams of fuel oil. This is equivalent to 5.5 pounds of fuel oil and 0.9 pound of the amine per ton of feed. The pulp thus prepared was placed in a small cell with sufficient additional saturated brine to adjust the pulp to approximately 25% solids. The pulp was agitated and aerated, and and while agitation was continued, a saturated brine of sylvinite was added in the lower strata of the cell. The agitation rate was controlled to keep the solids in suspension in the lower half of the cell without creating turbulence at the surface. The contents of the cell were permitted to overflow for a period of about four minutes. The overflow was collected and the coarse granular sylvite separated therefrom; the concentrate and tailing fractions were analyzed as shown in Table II, run 1.

*Example II*

Another sample of 700 grams was taken from the feed material prepared in Example I and processed as outlined in Example I except that an aqueous solution of mixed salts saturated with respect to the ore (high density brine) was used to prepared the pulp and to cause the overflow of the sylvite concentrate. Table II, run 2, records the results obtained.

TABLE II

| Run | Aqueous Brine | Mesh Size | Concentrate | Tails |
|---|---|---|---|---|
| 1 | Saturated Sylvinite | −6 | 61.0 $K_2O$ | 0.5 $K_2O$ |
| 2 | High Density Brine | −6 | 60.1 $K_2O$ | 1.1 $K_2O$ |
| 3 | do | −8 | 60.4 $K_2O$ | 0.9 $K_2O$ |
| 4 | do | −7 | 59.7 $K_2O$ | 0.5 $K_2O$ |
| 5 | Saturated Sylvinite | −8 | 60.1 $K_2O$ | 0.6 $K_2O$ |
| 6 | High Density Brine | −4 | 59.8 $K_2O$ | 0.7 $K_2O$ |
| Average | | | 60.18 $K_2O$ | 0.88 $K_2O$ |

The results obtained in Examples I and II indicate clearly that a coarse granular 60% muriate of potash may be obtained by the instant process.

The process as outlined in Example II was employed in making the other runs shown in Table II with the various brines indicated except that the material used was of a different mesh size. Table II, run 3, records the results using the same brine as in Example II. Likewise, Table II, run 4, records the results of a similar test employing −7 mesh feed. Table II, run 5, records the results obtained following the procedure of Example I using −8 mesh feed. Table II, run 6, shows the results obtained using a −4 mesh feed. The results indicated in Table II show the marked effectiveness of the instant novel process.

*Example III*

A pulp was prepared by admixing 100 pounds of coarsely ground, deslimed sylvinite ore of a mesh size of between about 4 and about 20 and 50 pounds of an aqueous solution of mixed salts saturated with respect to the ore (high density brine). The pulp was then conditioned with 0.05 pound of octadecylamine acetate and 0.28 pound of fuel oil. This pulp, diluted to approximately 25% solids additional high density brine, was placed in a cell of a size sufficient to hold all of the pulp. The pulp was then agitated and aerated, said agitation being confined to the contents of the lower strata of said cell. While the solid contents of said pulp were maintained in an unsettled condition by the agitation, additional high density brine was introduced into the contents of the lower strata of said cell. The relatively quiescent contents of the upper strata of said cell were allowed to overflow the cell for a period of approximately 4 minutes. The overflow material was collected and the solid granular sylvite separated therefrom. The average feed analysis of the aforementioned coarsely ground ore was 19.84% $K_2O$. The $K_2O$ equivalent of the product averaged 59.8%. The actual number of pounds of coarse granular sylvite recovered was 32.5. This amounts to approximately 97% recovery.

*Example IV*

A pulp was prepared by admixing about 700 grams of −8 mesh deslimed sylvinite-langbeinite mixed ore and about 300 grams of mixed ore brine saturated with respect to sylvinite. The pulp was reagentized with 15 cc. of a 5.0% aqueous solution of octadecylamine acetate. The pulp was processed as outlined in Example III, and the overflow was collected and granular sylvite separated therefrom. The $K_2O$ equivalent of the product was about 52% and the recovery was about 94.4%. The langbeinite was recovered from the tailings by leaching with water to remove the halite. The langbeinite tailings analyzed about 28.3% langbeinite, and the recovery was about 70%.

This application is a continuing application of United States application Serial No. 184,021, Albert Adams, filed September 9, 1950, for Flotation Apparatus, and United States application Serial No. 189,570, Edgar E. Wrege and Albert Adams, filed October 11, 1950, for Process for the Concentration of Sylvite, which latter application in turn is a continuation-in-part of United States Serial No. 101,482, Edgar E. Wrege and Albert Adams, filed June 25, 1949, for Process for the Concentration of Sylvite, all of which applications are now abandoned.

Having thus fully described the nature and character of the invention, what is desired to be secured by Letters Patent is:

1. In a process of preparing a concentrate from a coarse granular ore feed material of an average particle size larger than that normally used for froth flotation wherein a pulp is prepared comprising coarse reagentized granular ore and a liquid medium in which at least the concentrate is insoluble, the steps comprising introducing a stream of reagentized pulp directly into an aeration and agitation zone, separately introducing solids-free liquid medium in which at least the concentrate is insoluble into the agitation zone at a point below that of introduction of the reagentized pulp, moving the aerated portion of said pulp in response to an upwardly directed flow of said liquid medium into a separation zone, removing liquid medium and the aerated portion of the pulp from the top of said separation zone, removing the settling portion of said pulp from the bottom of said agitation zone, and separating the concentrate portion from said fluid medium.

2. In a process of preparing a coarse granular concentrate from coarsely ground potash ore wherein a pulp is prepared comprising essentially deslimed, coarsely ground reagentized potash ore and a brine saturated at least with respect to the granular concentrate as the separation medium, the steps comprising introducing a stream of reagentized pulp into an aeration and agitation zone, separately introducing solids-free brine saturated with respect to the granular concentrate into the agitation zone at a point below that of introduction of the reagentized pulp, moving the aerated portion of said pulp in response to an upwardly directed flow of said brine into a separation zone, removing brine and the aerated portion of the pulp from the top of said separation zone, removing the settling portion of said pulp from the bottom of said agitation zone, and separating the concentrate portion from said brine.

3. In a process according to claim 2, the step comprising flowing a liquid of greater density than the liquid used to initially prepare the pulp.

4. In a process of concentrating sylvite in coarse graular form from coarsely ground sylvinite ore wherein a pulp is prepared comprising essentially deslimed coarsely ground reagentized sylvinite ore and a brine saturated at least with respect to potassium chloride, the steps comprising introducing a stream of reagentized pulped sylvinite into an aeration and agitation zone, separately introducing solids-free brine saturated with respect to potassium chloride into the agitation zone at a point below that of introduction of the reagentized pulp, moving the aerated sylvite portion of said pulp in response to an upwardly directed flow of said brine to a separation zone, removing brine and the sylvite from the top of said separation zone, removing the settling halite portion of said pulp from the bottom of said agitation zone, and separating the sylvite from said brine.

5. In a process of concentrating sylvite in coarse granular form from coarsely ground sylvinite-langbeinite mixed ore wherein a pulp is prepared comprising essentially deslimed coarsely ground reagentized sylvinite-langbeinite ore and a solids-free brine saturated with respect to the soluble constituents of said ore, the steps comprising introducing a stream of reagentized pulped sylvinite into an aeration and agitation zone, separately introducing solids-free brine saturated with respect to potassium chloride into the agitation zone at a point below that of introduction of the reagentized pulp, moving the aerated sylvite portion of said pulp in response to an upwardly directed flow of said brine to a separation zone, removing brine and the sylvite from the top of said separation zone, removing the settling portion of said pulp from the bottom of said agitation zone, and separating the sylvite from said brine.

6. In a process of concentrating sylvite in coarse granular form from coarsely ground sylvinite ore wherein a pulp is prepared comprising essentially deslimed coarsely ground reagentized sylvinite ore and a solids-free brine saturated at least with respect to potassium chloride, the steps comprising introducing a stream of reagentized pulp into an aeration and agitation zone, separately introducing solids-free brine saturated with respect to sylvinite ore at a point below that of introduction of the reagentized pulp, moving the aerated sylvite portion of said pulp in response to an upwardly directed flow of said brine into a separation zone, flowing said brine in an amount sufficient to create an overflow depth of liquid greater than the average diameter of the floated granular sylvite, removing brine and the sylvite from the top of said separation zone, and separating the sylvite from said brine.

7. In a process of concentrating sylvite in coarse granular form from coarsely ground sylvinite-langbeinite mixed ore wherein a pulp is prepared comprising essentially deslimed, coarsely ground reagentized sylvinite-langbeinite mixed ore and a brine saturated with respect to the soluble constituents of said ore, the steps comprising introducing a stream of reagentized pulp into an aeration and agitation zone, separately introducing solids-free brine saturated with respect to sylvinite ore at a point below that of introduction of the reagentized pulp, moving the aerated sylvite portion of said pulp in response to an upwardly directed flow of said brine into a separation zone, flowing said brine in an amount sufficient to create an overflow depth of liquid greater than the average diameter of the floated granular sylvite, removing brine and the sylvite from the top of said separation zone, and separating the sylvite from said brine.

8. In a process of concentrating sylvite from coarsely ground sylvinite ore wherein a pulp is prepared comprising deslimed sylvinite ore comminuted only sufficiently to substantially liberate particles of sylvite and a brine saturated at least with respect to potassium chloride, the steps comprising introducing a stream of reagentized pulp into an aeration and agitation zone, separately introducing solids-free brine saturated with respect to sylvinite ore at a point below that of introduction of the reagentized pulp, moving the aerated sylvite portion of said pulp in response to an upwardly directed flow of said brine into a separation zone, flowing said brine in an amount sufficient to create an overflow of liquid greater than the average diameter of the floated granular sylvite, removing brine and the sylvite from the top of said separation zone, removing the settling portion of said pulp from the bottom of said agitation zone, and separating the sylvite from said brine.

9. In a process of preparing a sylvite concentrate from coarsely ground sylvinite ore, the steps comprising desliming coarsely ground sylvinite ore, conditioning said deslimed ore with surface active reagent having affinity for sylvite, introducing a stream of reagentized ore in slurry form with brine saturated at least with respect to potassium chloride entering an aeration and agitation zone, separately introducing solids-free brine saturated with respect to potassium chloride into the agitation zone at a point below that of introduction of the reagentized pulp, moving the aerated sylvite portion of said pulp in response to an upwardly directed flow of said brine into a separation zone, removing brine and the aerated portion of the pulp from the top of said separation zone, removing the aerated portion of said pulp from the bottom of said agitation zone, and separating the sylvite from said brine.

10. In a process for preparing a coarse granular concentrate from coarsely ground potash ore which comprises comminuting the ore to coarse granular size, desliming said ore, preparing a pulp of said deslimed ore in a brine saturated at least with respect to sodium chloride, conditioning said pulped ore with surface active reagent having affinity for halite, introducing a stream of reagentized pulp to an aeration and agitation zone, separately introducing solids-free brine saturated with respect to halite into the agitation zone at a point below that of introduction of the reagentized pulp, moving the aerated portion of said pulp in response to an upwardly directed flow of said brine into a separation zone, removing brine and the floated halite material from the top of said separation zone, removing the sylvite portion of said pulp from the bottom of said agitation zone, and separating the halite from said brine.

11. In a process for preparing a coarse granular concentrate from coarsely ground sylvinite-langbeinite ore which comprises comminuting the ore to coarse granular size, desliming said ore, preparing a pulp of said deslimed ore in a brine saturated at least with respect to sodium chloride, conditioning said pulped ore with surface active reagent having affinity for halite, introducing a stream of reagentized pulp to an aeration and agitation zone, separately introducing solids-free brine saturated with respect to halite into the agitation zone at a point below that of introduction of the reagentized pulp, moving the aerated portion of said pulp in response to an upwardly directed flow of said brine into a separation zone, removing brine and the floated halite material from the top of said separation zone, removing the sylvinite-langbeinite portion of said pulp from the bottom of said agitation zone, and separating the halite from said brine.

12. In a process for preparing a coarse granular concentrate from coarsely ground sylvinite-langbeinite ore which comprises comminuting the ore to coarse granular size, desliming said ore, preparing a pulp of said deslimed ore in a brine saturated at least with respect to sodium chloride, conditioning said pulped ore with surface active reagent having affinity for langbeinite, introducing a stream of reagentized pulp to an aeration and agitation zone, separately introducing solids-free brine saturated with respect to langbeinite into the agitation zone at a point below that of introduction of the reagentized pulp, moving the aerated portion of said pulp in response to an upwardly directed flow of said brine into a separation zone, removing brine and the floated langbeinite material from the top of said separation zone, removing the sylvinite-langbeinite portion of said pulp from the bottom of said agitation zone, and separating the langbeinite from said brine.

13. In a process of preparing a sylvite concentrate from coarsely ground sylvinite ore, the steps comprising desliming coarsely ground sylvinite ore, conditioning said deslimed ore with surface active reagent having affinity for sylvite, introducing a stream of reagentized ore in slurry form with brine saturated at least with respect to potassium chloride and sylvinite ore entering an aeration and agitation zone, separately introducing solids-free brine saturated with respect to potassium chloride and sylvinite ore into the agitation zone at a point below that of introduction of the reagentized pulp, moving the aerated sylvite portion of said pulp in response to an upwardly directed flow of said brine into a separation zone, removing brine and the aerated portion of the pulp from the top of said separation zone, removing the aerated portion of said pulp from the bottom of said agitation zone, and separating the sylvite from said brine.

14. In a process of preparing a sylvite concentrate from coarsely ground sylvinite ore, the steps comprising desliming coarsely ground sylvinite ore, conditioning said deslimed ore with surface active reagent having affinity for sylvite, introducing a stream of reagentized ore in slurry form with brine saturated at least with respect to sylvinite and sylvinite-langbeinite mixed ore entering an aeration and agitation zone, separately introducing solids-free brine saturated with respect to sylvinite and sylvinite-langbeinite mixed ore into the agitation zone at a point below that of introduction of the reagentized pulp, moving the aerated sylvite portion of said pulp in response to an upwardly directed flow of said brine into a separation zone, removing brine and the aerated portion of the pulp from the top of said separation zone, removing the aerated portion of said pulp from the bottom of said agitation zone, and separating the sylvite from said brine.

References Cited in the file of this patent

UNITED STATES PATENTS

| | | |
|---|---|---|
| 1,035,145 | Beeken | Aug. 13, 1912 |
| 1,375,211 | Cole | Apr. 19, 1921 |
| 2,054,539 | Gutzeit | Sept. 15, 1936 |
| 2,176,107 | Smith | Oct. 17, 1939 |
| 2,214,206 | Rasor | Sept. 10, 1940 |
| 2,226,170 | Lasseter | Dec. 24, 1940 |
| 2,304,270 | Mead et al. | Dec. 8, 1942 |

OTHER REFERENCES

Bureau of Mines Report of Investigations 3271, February 1935. (Copy in Scientific Library.)